(12) United States Patent
Barry

(10) Patent No.: US 7,438,515 B2
(45) Date of Patent: Oct. 21, 2008

(54) CONTAINER DUMP TRUCK AND OBLIQUE TRANSFER SYSTEM

(76) Inventor: Leonard D. Barry, 19300 Pennington Dr., Detroit, MI (US) 48221

( * ) Notice: Subject to any disclaimer, the term of this patent is extended or adjusted under 35 U.S.C. 154(b) by 0 days.

(21) Appl. No.: 11/560,435

(22) Filed: Nov. 16, 2006

(65) Prior Publication Data

US 2007/0110551 A1 May 17, 2007

Related U.S. Application Data

(63) Continuation-in-part of application No. 11/134,926, filed on May 23, 2005, now abandoned, and a continuation-in-part of application No. 10/663,293, filed on Sep. 16, 2003, now Pat. No. 7,121,782.

(60) Provisional application No. 60/573,439, filed on May 21, 2004.

(51) Int. Cl.
*B65G 67/02* (2006.01)
(52) U.S. Cl. ...................................... 414/338; 414/337
(58) Field of Classification Search ............ 296/100.03; 298/17.6, 18; 414/337, 338
See application file for complete search history.

(56) References Cited

U.S. PATENT DOCUMENTS

| | | | | |
|---|---|---|---|---|
| 2,099,684 A | * | 11/1937 | Fitch | 414/482 |
| 2,264,216 A | * | 11/1941 | Milligan | 414/491 |
| 3,186,756 A | * | 6/1965 | Saut et al. | 296/100.03 |
| 3,316,019 A | * | 4/1967 | Flowers | 298/17.6 |
| RE28,980 E | * | 9/1976 | Mackenzie | 414/325 |
| 4,141,591 A | * | 2/1979 | Spicer | 298/17.6 |
| 4,453,878 A | * | 6/1984 | Paukku | 414/491 |
| 4,826,386 A | * | 5/1989 | Corompt | 414/421 |
| 6,619,904 B1 | * | 9/2003 | Barry | 414/337 |
| 6,652,214 B1 | * | 11/2003 | Barry | 414/337 |
| 6,726,431 B2 | * | 4/2004 | Morrell | 414/340 |
| 6,814,396 B2 | * | 11/2004 | Greer et al. | 296/183.2 |

(Continued)

OTHER PUBLICATIONS

Article by Lisa M. Kempfer entitled "Outsourcing Bulk Container Management" from Material Handling Management magazine dated Mar. 2005.

*Primary Examiner*—James Keenan
(74) *Attorney, Agent, or Firm*—Gifford, Krass, Sprinkle, Anderson & Citkowski, P.C.

(57) ABSTRACT

This invention is a drive-by side transfer system including a dump container and its dump truck. The truck has a bed mounted for rear or side dumping and has one or more parallel roller or slide channel-ways run obliquely across the bed extendable beyond at least one side to engage between facing channels run on the same oblique angle across in the bottom frame of the container to guide on the ways on the truck to be engaged by the truck's movement alongside of the platform to transfer the container between a platform (such as on a dock, storage spot, railway car, or conveyor) and the truck bed. The truck has a self-chocking hydraulic lift with dog or dog and tongue operated to engage the bottom of the dump container to tilt the container on the truck to dump its load. The container has a retractable roof. The truck is driven to transfer the container from or to the truck according to whether an end roller on the platform is hit from the end to push the container out off onto the platform or pass by the roller to keep the container on the truck.

6 Claims, 5 Drawing Sheets

U.S. PATENT DOCUMENTS 7,014,410 B2 * 3/2006 Barry .................... 414/337
7,121,782 B2 * 10/2006 Barry .................... 414/337
2002/0044858 A1 * 4/2002 Barry .................... 414/392

* cited by examiner

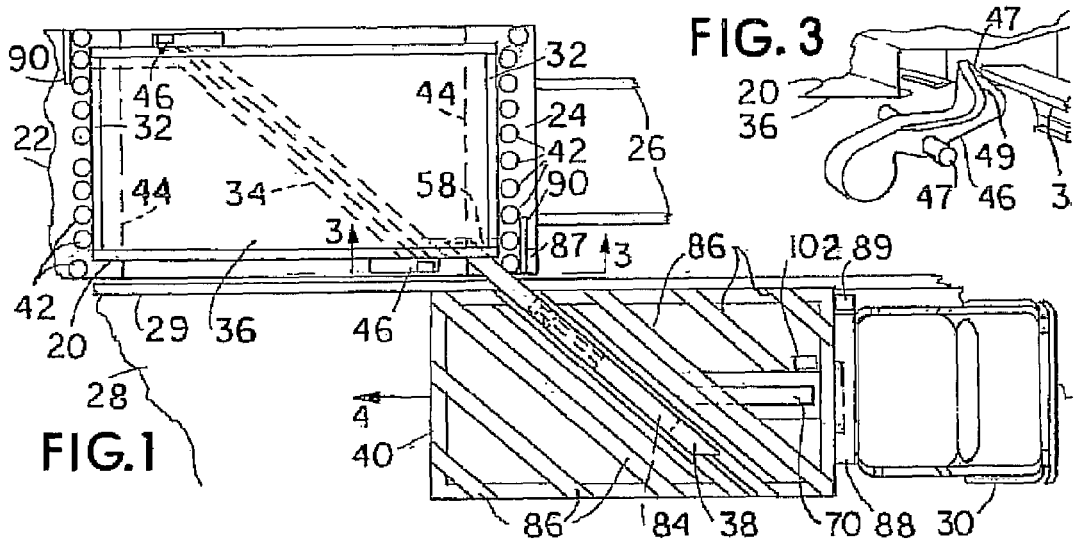
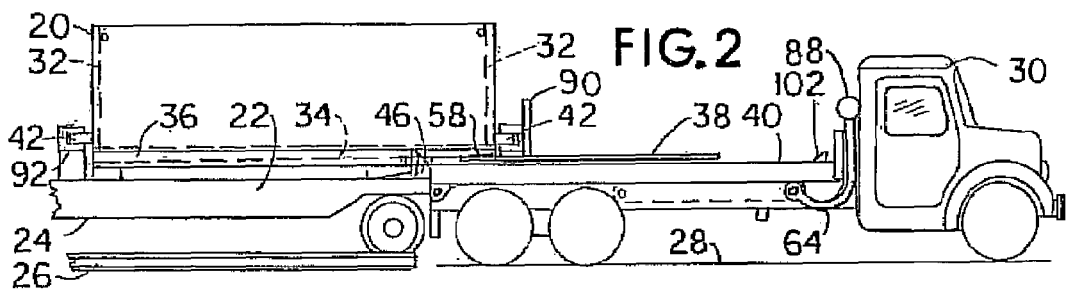
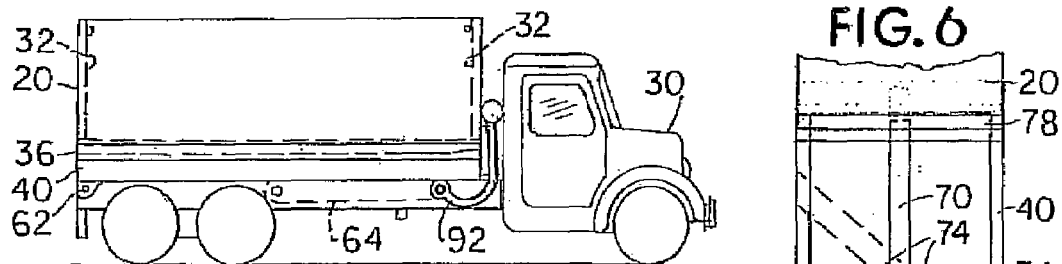
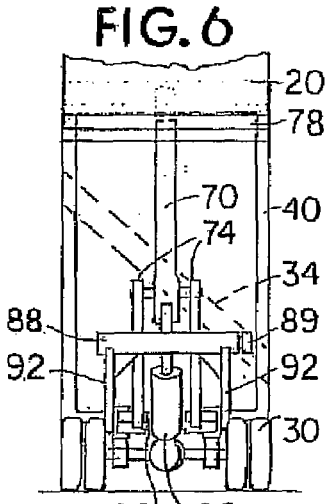
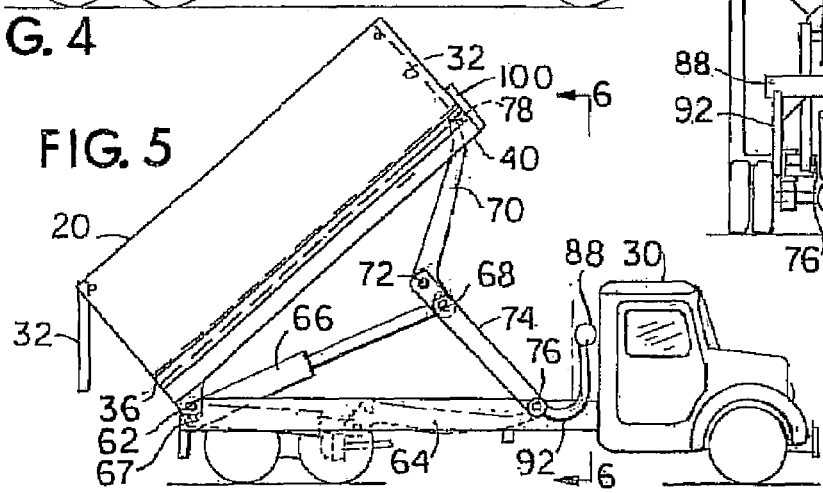

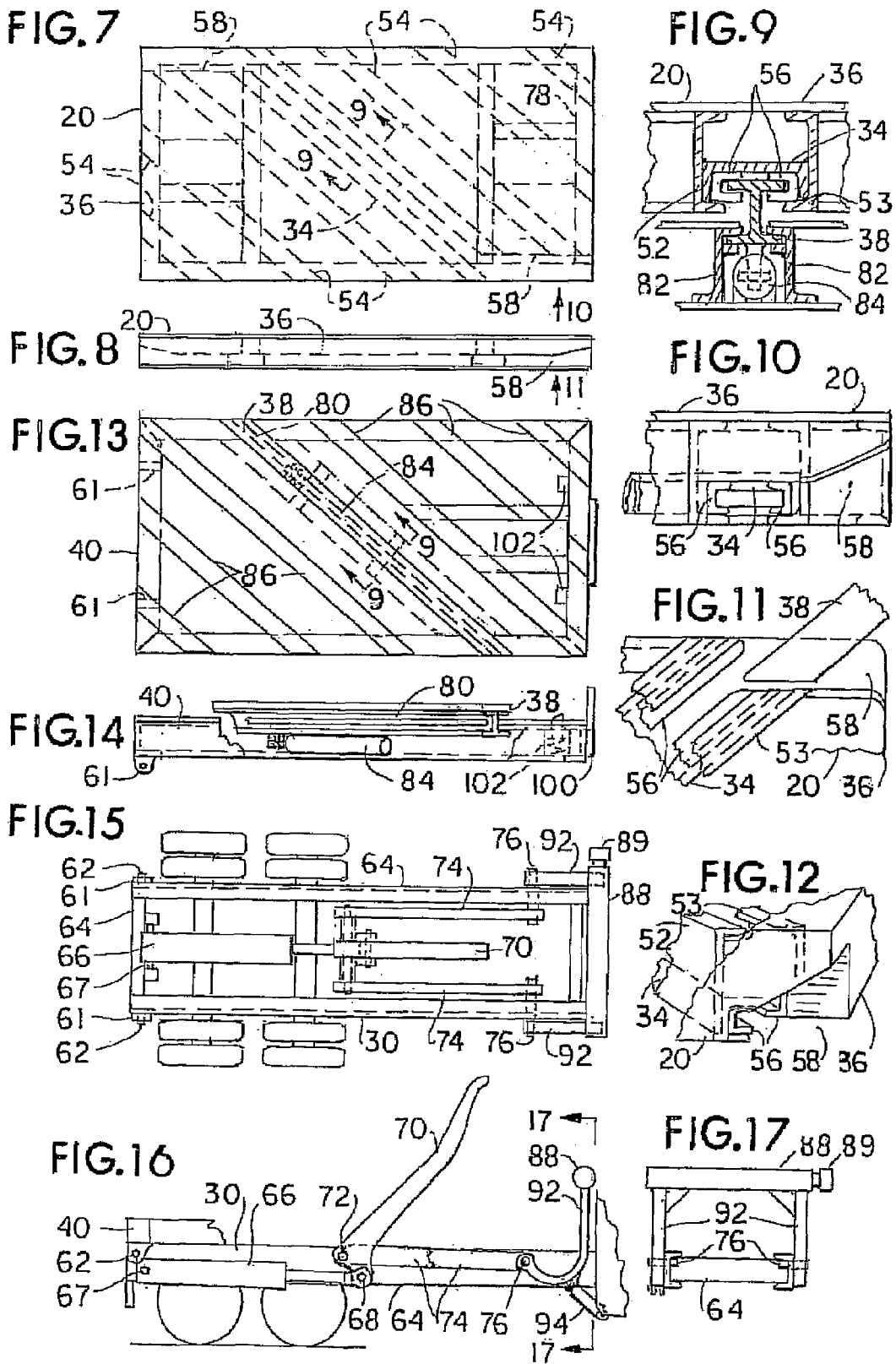

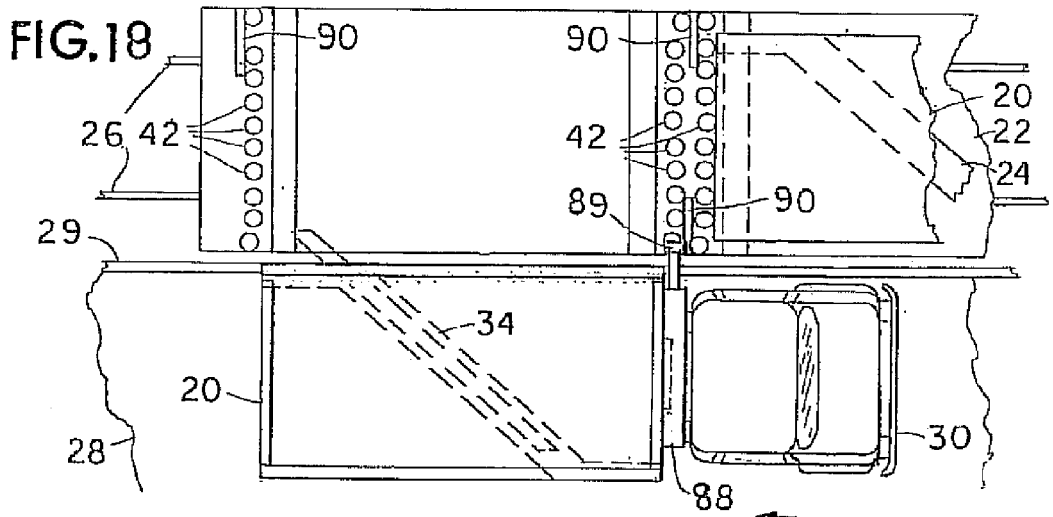
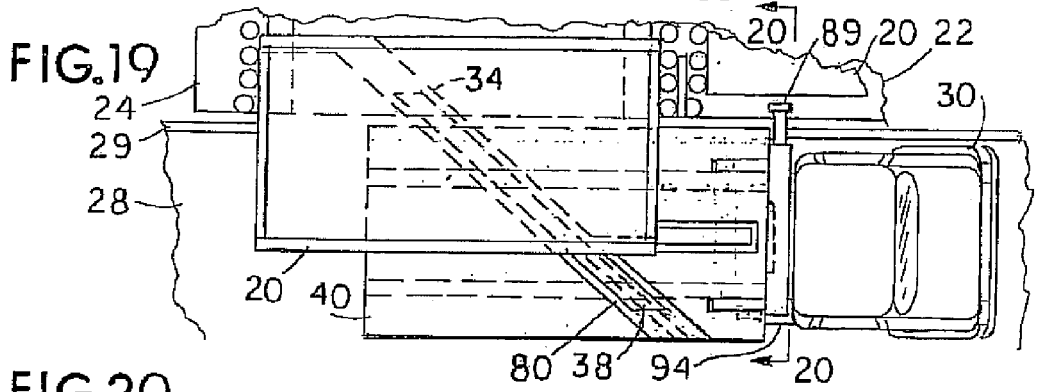
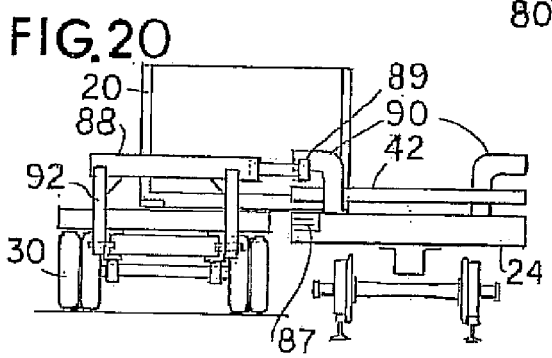
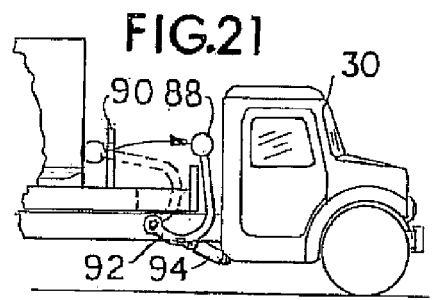
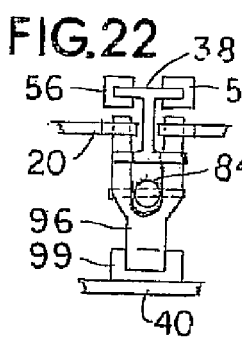
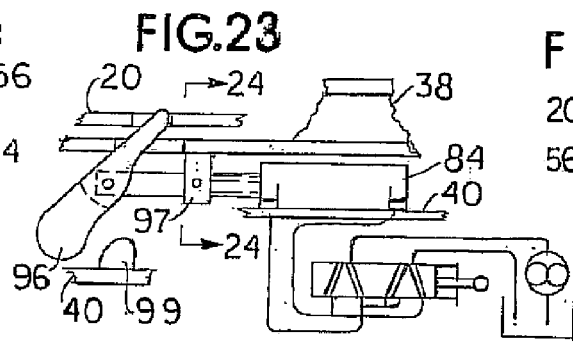
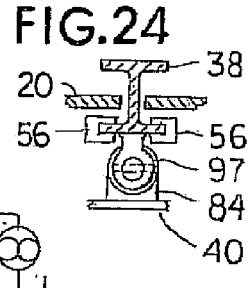

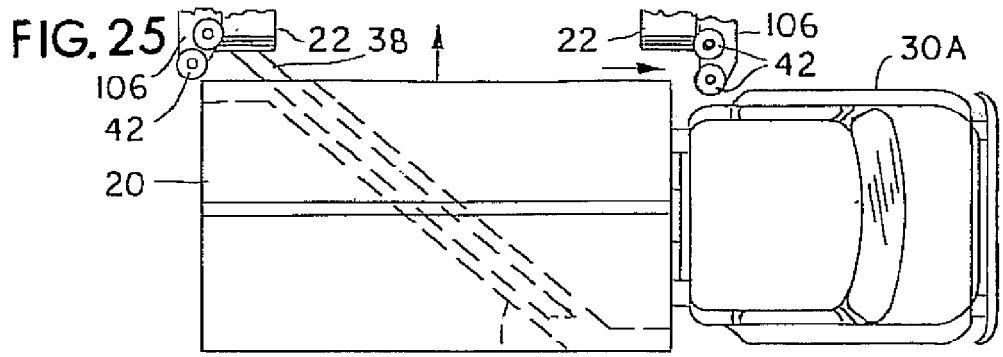
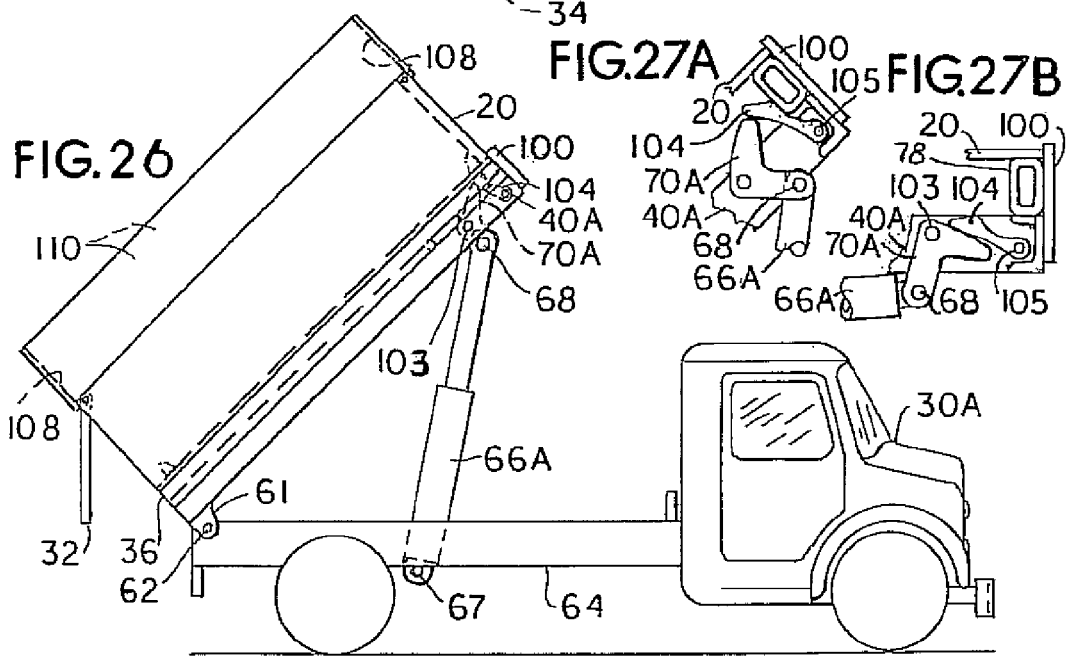
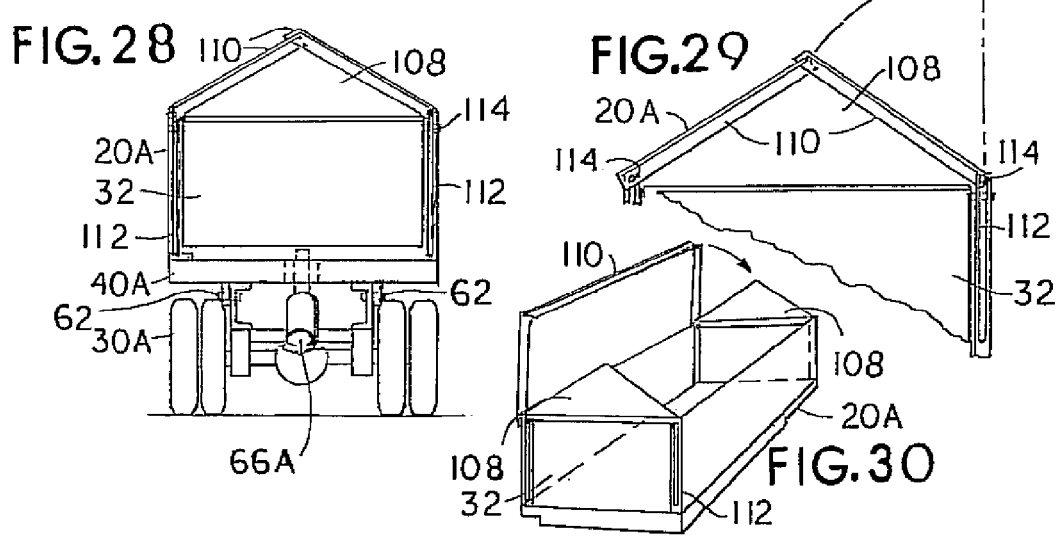

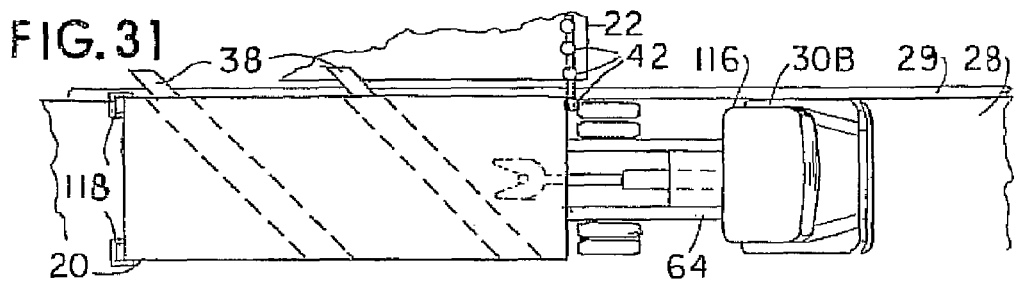
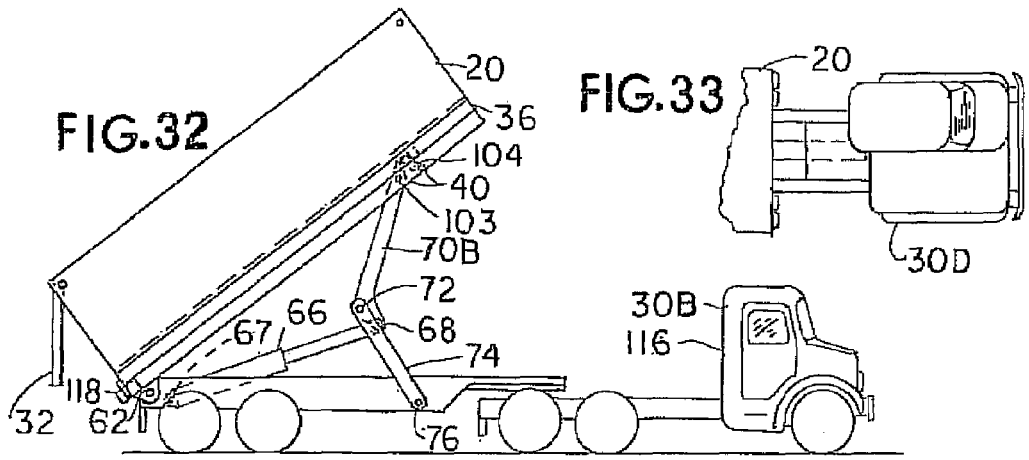
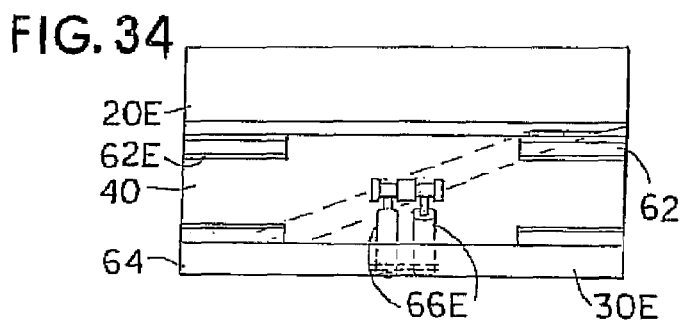
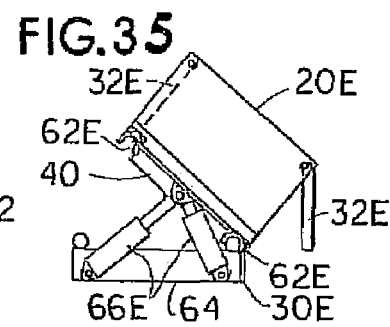
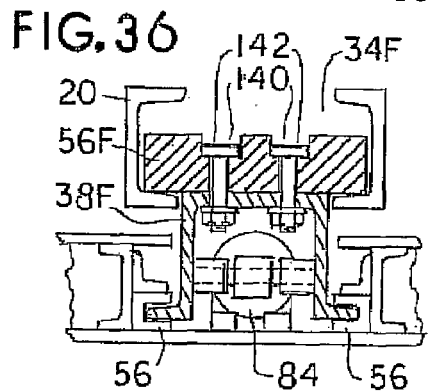
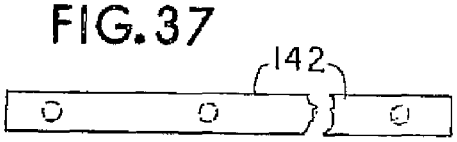
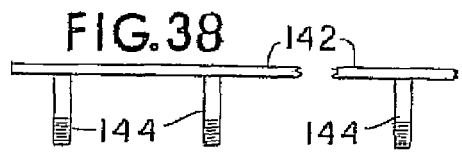

CONTAINER DUMP TRUCK AND OBLIQUE TRANSFER SYSTEM

CROSS-REFERENCE TO RELATED APPLICATIONS

This invention is a continuation-in-part of my U.S. application Ser. No. 11/134,926 filed May 23, 2005, now abandoned which claims priority of U.S. Provisional Patent Application No. 60/573,439 filed May 21, 2004 and is a continuation-in-part of U.S. patent application Ser. No. 10/663,293 filed Sep. 16, 2003, now U.S. Pat. No. 7,121,782. This application also relates to my U.S. Pat. Nos. 6,652,214 issued Nov. 25, 2003; U.S. Pat. No. 6,695,561 issued Feb. 24, 2004; and U.S. Pat. No. 7,014,410 issued Mar. 21, 2006.

FIELD OF THE INVENTION

This invention is an application of my drive-by transfer to dump trucks. My pending application, (now U.S. Pat. No. 7,014,410) in FIG. 16, shows the parallel transfer of a container between a platform and a truck bed along a straight oblique channel path therebetween. It is now an object to provide a bulk dump container for this transfer and a truck that will tilt the front (or either side) of the container up for dumping.

SUMMARY OF THE INVENTION

It is an object to provide an oblique transfer and bulk dump container and a dump truck for drive-by transfer and dumping the bulk container loads.

It is an object to provide cooperating rail cars with bulk end-dump containers for truck drive-by transfer with trucks that can lift the front end of the container to dump it.

It is an object to provide means for easy transfer of bulk containers on railway cars to trucks to carry the container loads to a dump and dump tie loads and return the containers onto the railway cars rather than unloading bulls material from hopper or gondola cars into dump trucks as is now practiced.

It is desired to provide the container with end dump doors and be able to dump the container with either end forward on the truck.

It is an object to provide a side transfer bed on the truck that lifts to dump an end dump container it transfers.

It is an object to provide a container bottom frame with one or more shallow oblique channels thereacross flush with the bottom surface and within the thickness of the frame into which a flat slide key on the truck slip fits with no increase in the height of the truck and container.

It is the object to provide a truck or trailer, chassis or frame, having a bed hinge mounted at the rear and a hydraulic lift for the front, the bed having at least one oblique flat slide key to align in an oblique channel on the container to guide the container parallel along transfer ways and support it for dumping.

It is an object to provide transfer ways to keep the combined height of the container bottom and truck bed to a minimum and the weight of the container and truck bed low.

It is an object to securely hold the container in place on tie dump lift bed.

It is an object to eliminate slack movement between the container and the lift bed when lifting and lowering the dump lift bed.

It is an object to tight lock the container to the lift bed before the bed is lifted.

Another object is to provide a retractable roof for the bulk dump container to safeguard the contents. It is desired to provide a lightweight roof winch when open is stored along the sides of the container.

An object is to enable transfer of bulk in containers between train and dump trucks quickly to continue a haul to dump site without loose transfer of bulk material.

It is also an object to provide this invention as a toy.

BRIEF DESCRIPTION OF THE DRAWING

These, other and further objects should become evident to those skilled in the art by study of this specification taken with reference to the drawings wherein:

FIGS. 1 and 2 are respectively plan and side views of the dump truck backing up to engage a dump container on a platform on a dock, conveyor or railway car.

FIG. 3 is an enlarged view of a latch on line 3-3 of FIG. 1.

FIGS. 4 and 5 are side views of the container on the truck respectively after transfer of the container to the truck and in dumping position.

FIG. 6 is a sectional elevation taken on line 6-6 of FIG. 5.

FIGS. 7 and 9 are respectively plan and side views of the bottom framing of the container.

FIGS. 9, 10 and 11 are detail views taken on lines 9-9 and 10 of FIG. 7 and line 11 of FIG. 8.

FIG. 12 is a perspective view of the lower right corner of a container.

FIGS. 13 and 14 are respectively plan and side views of the transfer-dump bed for the truck.

FIGS. 15 and 16 are respectively partial plan and side views of the truck chassis showing the lift mechanism in lifted position.

FIG. 17 is a sectional view on line 17-17 of FIG. 16.

FIGS. 18 and 19 are successive plan views of the truck transferring the container to the railway car.

FIG. 20 is a sectional elevation on lines 20-20 of FIG. 19.

FIG. 21 is a side elevation of the front end of the truck of FIG. 19.

FIGS. 22 and 23 are respectively end and side schematic views of the pull-in dog on the truck bed pulling in the container.

FIG. 24 is a section on line 24-24 of FIG. 23.

FIG. 25 is a plan view of a variation of the dump truck with a covered dump container engaging the side of a docking platform.

FIG. 26 is a side view of the truck and container of FIG. 25 in dumping position.

FIGS. 27A and 27B are detail views of the container lift latch dog and space filler tongue of FIG. 26 to larger scale in respectively locked and released positions.

FIG. 28 is a rear view of the truck and container of FIG. 25.

FIG. 29 is a partial end view of the retractable roof for the container.

FIG. 30 is a perspective view of the container with roof partly open.

FIG. 31 is a plan view of a tractor-trailer extended to receive or deposit a dump container from the front of the truck.

FIG. 32 is a side view of the truck of FIG. 31 dumping the container.

FIG. 33 is a partial plan view of a half cab tractor or truck to give clearance for the container to be transferred to and from the front on the side opposite the driver.

FIGS. 34 and 35 are schematic plan and end views of a side dump truck bed tilting a side dumping container.

FIG. 36 is a sectional elevation of a preferred heavy duty transfer key engaged in an oblique channel.

FIGS. 37 and 38 are respectively plan and side elevations of a retaining strip for the transfer key of FIG. 36.

DETAILED DESCRIPTION OF THE INVENTION

Referring to the drawings and in particular to FIGS. 1-21, dump container 20 on platform 22 of a dock, conveyor, or railway car 24 is positioned on track 26 alongside driveway 28 on which dump truck 30 is driven to transfer the container between the truck and platform. Driveway 28 has curb 29 along the platform to help guide the truck. Container 20 has a dump door 32 at each end and a recessed flush channel-way 34 of approximately rectangular tube shape broad side down with a bottom central slot run obliquely across tie bottom frame 36 of container 20 to receive an oblique key flat 38 into channel 34. Flat 38 is supported just above the bed with clearance for the bottom legs of said channel-way 34 to tuck tinder the sides of the flat key and clear or slide across the top of lift bed 40 on truck 30 along the oblique angle to engage in channel-way 34 to slip-key the container on the bed.

Platform 22 has end guides or rollers 42 and end support rollers or slides 44 for guiding and supporting container 20 to move parallel on and off of platform 22. Rollers 42 are mounted in rows straight across the platform along the ends of each container berth except the end roller on the left is optionally set back from the container berth as shown in FIGS. 1 and 18 to improve alignment tolerance when engaging the container for transfer from the truck.

Latch 46 is a lever arm pivoted near center on pin 47 to swing in a slot parallel along the transfer side of platform 22 latching end up by weight on opposite end. The latch has an entrance taper 47 to swing down when engaged by key 38 and a taper 49 down to the transfer side to swing down when engaged by the container entering the platform.

The container bottom, FIGS. 1 and 7-12 is a rectangular frame 36 with oblique channel 34 turned legs down recessed between vertical webs of facing parallel channels 52 and 53 run parallel with the other cross-members 54 obliquely across the container's bottom frame. Channel 34 is secured to the top of the bottom flanges of channels 52 and 53 and opens out the transfer sides. Channels 34, 52 and 53 are welded or secured as one within the bottom frame 36. Plastic strips 56 are secured along the inner sides of legs of channel 34 for key 38 on bed 40 to enter, slide, and pull the container over onto bed 40 when the truck in FIG. 1 is backed up. Channel 34 is oblique to the sides and centered between the ends of the container starting equally in from the right-hand end of each side so the container can align end-for-end on bed 40. The lower right-hand corners of the container bottom are cut away at 58, FIG. 12, along the sides and tapered to receive key 38 to enter channel 34 from either side of the container. Channel-way 34 for flat key 38 leaves most of the depth of frame 36 intact for maximum strength with no extra height added for the channels and key 38.

Dump bed 40 is mounted on brackets 61 and hinge pins 62 along the back of the chassis 64 of truck 30 to tilt up at the front when lifted by a container 20. The container is lifted by hydraulic cylinder 66 pivotally connected head end on pin 67 to chassis 64 and rod end to pivot 68 on the bottom of a bellcrank lever dog 70 extended to first lift dog 70 pivoted at 72 above pivot 68 on arm 74 extending down and forward to pivot on pin 76 on the truck chassis, FIGS. 5, 6 and 15-16. Cylinder 66 is pivotally connected between the chassis and dog 70 to push dog 70 up at its forward end behind forward cross member 78 of the bottom frame 36 of container 20, FIGS. 5, 6, 15 and 16, to hold the container from sliding back when lifted on the bed. The lift linkage preferably has two link arms 74 with cylinder 66 and latch dog 70 pivoted between as shown in FIGS. 5 and 6.

Dump bed 40, FIGS. 1 and 13-14, is a rectangular frame with an oblique channel-way 80 supporting key 38 on the oblique angle. Key 38 can be an I-beam, as in FIG. 9, between two Z-beams 82 turned top legs in leaving space for a double acting cylinder 84 extending parallel between the Z beams and connecting frame 40 and key 38 to extend and retract the key along channel-way 80 from within the boundary of the bed out to the distance to engage key 38 in channel 34 on container 20 on the platform. Bed 40 has rollers or low friction plastic covered ways 86 run parallel to channel way 80 on the bed to support container 20 to roll or slide on and off the bed. Flat 38 has its end which extends out cut parallel to the side of the truck to engage with short overlap into channel 34 on the container. The bottom of this key 38 is cut away to leave a tongue where it extends from the truck to pull or push the container onto or from bed 40 onto platform 22. The key can flex up and down to be lifted by a ramp 87 at the end of the platform to lift flat tongue key 38 to a height to enter channel 34. The row rollers 42 on the railway car extend out to the edge of the platform over space for the tongue of key 38 to clear.

Referring to FIGS. 5, 6 and 15-21, the truck chassis 64 has a push-off arm 88 with roller 89 to engage behind tab 90 on car 24 to push the container out to the car when the truck is driven forward. Arm 88 is supported on two aligned curved arms 92 pivoted on a transverse axis to the chassis at 76. Arm 88 extends transversely behind the cab of the truck and telescopes out by air cylinder therein to engage roller 89 behind tab 90 (berth side) on the car. Arms 92 supporting arm 88 are biased by spring cylinder dashpot 94 (like a shock absorber) to swing forward on the truck to the position shown in FIGS. 5 and 16 and swing back as in FIG. 21 when pushed back by engaging roller 89 against tab 90 on the railway car. Tab 90 is supported as in FIG. 20 for roller 89 to clear under when the container is moved back far enough to engage curb rollers 42 on the car.

The push-off arm 88 can be omitted if the platform is always stationary (not on a transport vehicle) and the curb rollers 42 are extended as in FIGS. 25 and 31.

Referring to FIGS. 13 and 22-24, the truck bed has a dog 96 and yoke 97 pivotally mounted on the rod of cylinder 84. Yoke 97 connects the transfer key 38 to the cylinder to slide the key in and out along its channel 80. Dog 96 is forked to straddle and extend up through slots in key 38 to be lifted to the position shown in FIGS. 22 and 23 and engages in a hole or opening in the container to pull the container in fully onto the truck when retracting key 38 after transferring a container to the truck. Dog 96 engages a cam lift stop 99 to drop when the cylinder rod is fully retracted so the container can be moved later from the truck. The dog 96 can be omitted if the container is given enough momentum to complete transfers or if the platform is fixed stationary and tie row of rollers 42 at the left are extended to push the container fully on the truck as will be explained with FIGS. 25 and 31.

OPERATION

With container and truck in position as in FIG. 1 with key 38 extended over the side edge of platform 22, the truck is backed up. Key 38 pushes latch 46 open and enters channel 34 on the container, pulling the container onto bed 40 until rollers 42 at the left leave the back of the container and either momentum carries the container the rest of the way onto the truck or when key 38 is retracted dog 96 pushes the container to front stop 100 latching in place over air release latch 102 or other means and the truck driven to where its load in the container is to be dumped as shown in FIG. 5.

To dump the container load, cylinder 66 is pressured and swings the front end of lever dog 70 up to the floor of the container behind the forward cross-member 78 to hold the container from moving back and off of the bed as it is lifted by the container lifting the bed to which it is vertically secured by key 38. End door 32 at the back is released to swing open to dump. Dog 70 stays engaged with the container until the bed is fully lowered after dumping, and the container is secured by latch 102 for travel.

The container is returned to platform 22 by the driver extending arm 88 and key 38, releasing latch 102, and driving forward to engage tab 90 from behind, pushing the container back with arm 88 to tie platform 22 where the container engages forward rollers 42 which hold the container in line as key 38 slips the container off the bed and leaves the container in place on the platform behind forward latch 46. Key 38 is retracted by reversing air on cylinder 84 and the truck driven away.

VARIATIONS

Similar parts have the same number. Modified parts have a suffix letter added.

Referring to FIGS. 25-30 for a variation of the dump truck platform, and container, truck 30A has a bed 40A pivotally mounted at 62 to swing up at the front lifted by cylinder 66A between a short dog 70A and chassis 64. Dog 70A is pivotally mounted on pin 103 to the lift bed 40A and to the rod end of cylinder 66A on pin 68 below pin 103 and is extended up to engage behind cross member 78 of the bottom frame of the container 20 by cylinder 66A to hold the container from moving down off the bed when cylinder 66A lifts the bed.

Referring to FIGS. 26, 27A and 27B, the swing of dog 70A opens space between front stop 100 and the forward cross member 78 of the bottom frame of container 20. A tongue 104 is pivotally mounted at 105 to frame 40A and rests on dog 70A to be swung up and down with dog 70A to fill the space between dog 70A and a cross member 78 on the container when pushed forward against stop 100. Tongue 104 prevents the container from sliding back down (about an inch) when lifted and provides a tight holding of the container to the lift frame. The faces of the tongue are curved in concave to substantially fill this slack space as the dog lifts the tongue. Tongue 104 prevents the container from sliding down and banging on dog 70A when frame 40A is lifted. In contrast dog 70 directly supports the container with no slack when lifted.

Referring to FIG. 25, rollers 42 are extended out from the platform above clearance for key 38. Rollers 42 on the right extend to engage or clear the forward end of the container on the truck to respectively push it back on the truck to transfer it to the platform or keep the container. Roller 42 on the left extends out to the side of the container on the truck to push the container fully onto the truck to eliminate need for dog 96.

With the row of rollers so positioned as in FIG. 25, the forward end of the container on the truck can be engaged against the right-hand forward end roller 42 to push the container back off from the truck onto tie platform when the truck is driven to the right. The roller 42 at the left extends out to engage container 20 to roll against the back end of the container to push it out all the way into position for travel on the truck and then rolls along the side of the container if tie truck is backed up farther than needed to receive the container. The end roller 42 on the right (forward end) can be either passed or engaged by steering the truck as it is driven forward accordingly as desired respectively to keep the container just taken on the truck or unload a container from the truck. The truck driver steers to engage or miss rollers 42 on the stationary platform to respectively unload the container or pass them to keep the container. Therefore, rollers 42 can be kept in one position for transfer of the container both from and to the truck respectively as the forward end roller 42 is either hit by the end of the container or passed by steering the truck to roll along on the side of the container. Rollers 42 preferably are rubber covered to not mar the sides of the container. Rollers 42 are mounted in transverse slide channels 106 for adjustment in and out and locked in position.

The container can have a retractable cover comprising end gables 108 and a roof panel 110 for each side each mounted to slide in a track 112 on the outside of each end. End pins 114 preferably with rollers, on a horizontal axis along the bottom of the roof panels extend into the slot track 112 closed at the top. When the panels are raised to the top of the tracks they can swing over to roof the container with overlapping top edges from both sides.

Referring to FIGS. 31-32 for another variation, truck 30B is a tractor trailer with a fifth wheel mounted to extend back so the container 20 can clear the cab 116 for transfer at the front on the near side. One or more stop tabs 118 are inserted in pockets secured at the back or side of the bed 40 to prevent the container from moving out from the back and far side in addition to the lift linkage. Lift lever 70B is pivotally mounted to the lift frame 40 on pin 103 and two links 74 on pin 72 and to the rod end of cylinder 66 on pin 68 to lift the container on bed 40 as shown in FIG. 32.

Referring to FIG. 33, truck 30D) has a half cab so the fifth wheel need not be moved back as far for clearance of a container transferred at the front.

Referring to FIGS. 34-35, side dump vehicle 30E holds a side dump container 20E that has side dump doors 32E. Vehicle 30E has a side dump bed supported on the truck chassis in a hinge groove 62E along each side and hydraulic ram cylinders 66E pivotally connected between each side of the chassis and the midpoint transversely of the bed so that the pressuring of cylinders 66E on one side will tip the bed up on that side and dump on the opposite side and vice versa.

Referring to FIGS. 36-38 for a generally applicable variation of the transfer key and slide, a plastic bar 56F of low friction is mounted on the top of a steel hat-shaped section 38F. Bar 56F has two longitudinal channels 140. Into each recesses a strip 142, FIGS. 37 and 38, with stud bolts 144 welded on which fit through holes in the hat section to secure the bar thereto. Liners 56 are omitted and the construction is otherwise generally as described. Bar 56F has increased vertical tolerance in channel 34F and saves wear and grooving of the channel. Wear to bar 56F can be easily observed.

Having thus described a few embodiments, arrangements, and applications of my invention, these are not intended as a limitation on the scope of my invention which is intended to be covered in variations and applications thereof which would be apparent to those skilled in the arts and which come within the true spirit and scope of this my invention.

The invention claimed is:

1. A bulk container transfer and dump system comprising in combination:
   a dump container for bulk material and having a rectangular base frame with two parallel sides and an inverted channel extending at an oblique angle to said sides across the bottom, a berth for supporting said container in position for transfer, a truck having a chassis and a dump bed thereon for supporting said container, said bed being hinge mounted to said chassis and lift means to swing said bed up to dump said container, said lift means including a dump dog pivotally mounted to swing up on said truck to first automatically secure said container on said dump bed to dump contents of said container, said dump bed having a key track run at said oblique angle across said bed and a key therein extendable out from at least one side to engage in said channel to draw said container from said berth onto said bed, said dump dog automatically chocking said container to said dump bed on said truck before lifting to dump contents of said container while on said dump bed, said lift means being pivotally connected between said chassis and said dump bed to raise and lower said dump dog to chock first and then tilt said container for dumping its contents, said dump dog being pivotally connected to said dump bed above said lift means and behind contact points with said dump container thereby creating a space between the dog and the container when the dog is lifted, a forward stop for said container on said dump bed, a tongue pivotally connected to said dump bed forward of said dump dog, said tongue leaning back on top of the lifting end of said dump dog to chock tight said container.

2. A bulk container transfer and dump system comprising in combination:

a dump container for bulk material and having a rectangular base frame with two parallel sides and an inverted channel extending at an oblique angle to said sides across the bottom, a berth for supporting said container in position for transfer, a truck having a chassis and a dump bed thereon for supporting said container, said bed being hinge mounted to said chassis and lift means to swing said bed up to dump said container, said lift means including a dump dog pivotally mounted to swing up on said truck to first automatically secure said container on said dump bed to dump contents of said container, said dump bed having a key track run at said oblique angle across said bed and a key therein extendable out from at least one side to engage in said channel to draw said container from said berth onto said bed, said dog being a class one lever having an arm for swinging up to engage and lift said container and having a first and second pivot spaced on the lever the first above the second, a lift cylinder pivotally connected between the chassis of said truck and said dog's second pivot, a lift link pivotally connected between the chassis of said truck and the upper said pivot of said dog to raise said dog under said container to secure it from sliding back before lifting said container.

3. In a combination as in claim 2, said lift link being the dump bed of said truck.

4. In a combination as in claim 2, said lift link being connected between said chassis and said dog and separate from said bed.

5. A bulk container transfer and dump system comprising in combination: a dump container for bulk material having a rectangular frame with two sides and endward cross members, at least one inverted channel run at an oblique angle to said sides across the bottom recessed within said base frame and open along its center across the bottom, a berth for supporting said container in position for transfer, a truck having a chassis and a dump bed for said container, said dump bed being hinged mounted to the rear of said chassis to swing up to dump said container, said dump bed having a key track run at said oblique angle across said dump bed and a key therein extendable out from at least one side to engage in said channel to draw said container from said berth onto said bed, a lift dog mounted to engage and hold said container when said dog is lifted before lifting said container on said dump bed to tilt to dump material from said container, said lift dog being a class one lever having an arm for extending up under to support and lift said container and having a first and second pivot spaced on said lever, said first above said second, a lift link pivotally connected between said chassis and said first pivot, a lift cylinder pivotally connected between the chassis of said truck and said second pivot of said dog to raise said dog to engage behind a forward one of said crossmembers to hold said container from slipping off backward when it lifts said container.

6. The system of claim 5, wherein said lift link constitutes the dump bed of said truck.

* * * * *